US012749889B2

(12) United States Patent
Schulze et al.

(10) Patent No.: US 12,749,889 B2
(45) Date of Patent: Sep. 29, 2026

(54) METHOD FOR MONITORING THE INTEGRITY OF A CONTROL DEVICE

(71) Applicant: Vitesco Technologies Germany GmbH, Regensburg (DE)

(72) Inventors: Andreas Schulze, Lauf a. d. Peg. / OT Neunhof (DE); Andreas Schusser, Fürth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 161 days.

(21) Appl. No.: 18/607,728

(22) Filed: Mar. 18, 2024

(65) Prior Publication Data

US 2024/0305091 A1 Sep. 12, 2024

Related U.S. Application Data

(63) Continuation of application No. PCT/EP2022/074833, filed on Sep. 7, 2022.

(30) Foreign Application Priority Data

Sep. 16, 2021 (DE) ..................... 10 2021 210 296.4

(51) Int. Cl.
*H02H 9/02* (2006.01)
*H02H 1/00* (2006.01)

(52) U.S. Cl.
CPC ............ *H02H 9/02* (2013.01); *H02H 1/0007* (2013.01)

(58) Field of Classification Search
CPC .......... H02H 9/02; H02H 1/0007; B60L 3/04; B60L 3/0084; G01R 19/16571; G01R 31/006

(Continued)

(56) References Cited

U.S. PATENT DOCUMENTS 5,804,973 A 9/1998 Shinohara
11,070,045 B1 * 7/2021 Li .......................... H02H 3/207

(Continued)

FOREIGN PATENT DOCUMENTS

CN 111433613 A * 7/2020 ................ H02J 7/80
DE 102008049231 A1 4/2010

(Continued)

OTHER PUBLICATIONS

Gregory Rozman; Title: Mulfi-functional solid state power controller; Abstract, drawings and entire speficiation (Year: 2013).*

(Continued)

*Primary Examiner* — Dharti H Patel

(57) ABSTRACT

A method for monitoring the integrity of a control device is provided. The control device is operated in an on-board electrical system of a vehicle. At least one parallel circuit including a current-limiting unit and an electronic switching unit is arranged in a power path of the control device. A control unit can switch on and off the switching unit. Furthermore, a threshold value for an electrical power path current that flows in the power path when each switching unit is switched off is specified for the control device. A present current value of the power path current flowing in the power path is determined every time that, or regularly while, each switching unit is switched off. When the control unit is supplied with an activation signal, each switching unit is switched on by the control unit only if the respectively present current value is lower than the threshold value.

19 Claims, 4 Drawing Sheets

(58) Field of Classification Search
USPC .......................................................... 361/87
See application file for complete search history.

(56) References Cited

U.S. PATENT DOCUMENTS

| | | | | |
|---|---|---|---|---|
| 2003/0137786 | A1* | 7/2003 | Hasegawa | H02H 9/001 361/10 |
| 2007/0115604 | A1* | 5/2007 | Zettel | H01H 47/002 361/160 |
| 2009/0303647 | A1* | 12/2009 | Bauer | H02H 3/046 361/87 |
| 2013/0069662 | A1* | 3/2013 | Tanabe | G01R 31/3835 324/434 |
| 2013/0329327 | A1* | 12/2013 | Zara | H02H 3/207 361/86 |
| 2015/0063176 | A1 | 3/2015 | Derek | |
| 2015/0255979 | A1* | 9/2015 | Kaita | B60L 3/04 361/90 |
| 2016/0089998 | A1* | 3/2016 | Thömmes | B60L 3/0069 701/22 |
| 2020/0144832 | A1* | 5/2020 | Kim | H02J 7/62 |
| 2023/0191912 | A1* | 6/2023 | Koepf | H01H 9/362 361/42 |
| 2023/0415580 | A1* | 12/2023 | Wang | B60L 3/0084 |
| 2024/0170954 | A1* | 5/2024 | Tseng | H02H 9/02 |
| 2024/0363911 | A1* | 10/2024 | Ito | H01M 10/425 |

FOREIGN PATENT DOCUMENTS

| | | | | |
|---|---|---|---|---|
| DE | 102010062535 | A1 | 6/2012 | |
| DE | 102013008586 | A1 | 11/2014 | |
| DE | 102014216899 | A1 | 3/2015 | |
| DE | 102013225244 | A1 | 6/2015 | |
| DE | 102016215688 | A1 * | 2/2018 | H02H 9/001 |
| EP | 2562937 | A1 | 2/2013 | |

OTHER PUBLICATIONS

European Search Report dated Dec. 8, 2022 for corresponding European Patent Application No. PCT/EP2022/074883.
German Office Action dated Mar. 3, 2022 for corresponding German Patent Application No. 10 2021 210 296.4.

* cited by examiner

METHOD FOR MONITORING THE INTEGRITY OF A CONTROL DEVICE

CROSS-REFERENCE TO RELATED APPLICATIONS

This application claims the benefit of PCT Application PCT/EP2022/074883, filed Sep. 7, 2022, which claims priority to German Application 10 2021 210 296.4, filed Sep. 16, 2021. The disclosures of the above applications are incorporated herein by reference.

TECHNICAL FIELD

The disclosure relates to a method for monitoring the integrity of a control device, which is operated in an on-board electrical system of a vehicle and has a power path connected to a vehicle battery of the vehicle.

BACKGROUND

The integrity of a control device is in this case understood to mean the correct functioning of the components of the control device that perform the task of the control device. In particular, a control device operating in an on-board electrical system of a vehicle generally has at least one intermediate circuit including at least one capacitor, for example a ceramic capacitor. Ceramic capacitors, which are used directly on the battery voltage of a vehicle battery, pose a safety risk. Their (prior) damage caused by mechanical stress, overvoltage due to electrostatic discharge or during production can result in a thermal event. This (prior) damage cannot be reliably detected in a final test of the respective assembly. In the prior art, capacitors are subjected to power limitation, for example by way of series resistors or current monitoring, designed so as to be insensitive to mechanical stress, such as bending stress of a soldering point, in the field by way of what is known as soft termination, or protected against the short circuit of one of the capacitors by the series connection of capacitors. Furthermore, it is known practice to charge an intermediate circuit via a charging resistor to prevent current peaks when switching on a control device.

However, in low-resistance electrical paths with high-current loads, the measures mentioned are not able to be implemented or are only able to be implemented with a high level of expenditure. Using a series resistor to limit the power of capacitors also changes the electrical properties of the capacitors in an undesirable manner. Soft-terminated capacitors reduce their damage caused by mechanical stress within the assembly. However, soft termination does not cover (prior) damage to the capacitors in the manufacturing process thereof or in the course of assembly during production of the control devices or other faults in the field that are not caused by mechanical stress. A series circuit having two capacitors doubles the number of components and quadruples the price, since, if two capacitors of equal value are connected in series, their capacitance is halved.

SUMMARY

The disclosure provides a cost-effective method for monitoring the integrity of a control device, which is operated in an on-board electrical system of a vehicle and has a power path connected to a vehicle battery of the vehicle. In the method, at least one parallel circuit including a current-limiting unit and an electronic switching unit, is arranged in the power path. By way of a control unit of the control device, the switching unit is able to be switched to a switched-on state having a lower electrical resistance than the current-limiting unit, or to a switched-off state having a greater electrical resistance than the current-limiting unit. A threshold value for an electric power path current flowing in the power path, for the state of the inactive control device, is specified for the control device. A present current value of the power path current flowing in the power path is determined every time that, or regularly while, each switching unit is switched off. When the control unit is supplied with an activation signal for activating the control device, each switching unit is switched on by the control unit only if the respectively present current value is lower than the threshold value. When the control unit is supplied with a deactivation signal for deactivating the control device, each switching unit is switched off by the control unit.

Implementations of the disclosure may include one or more of the following optional features. In some implementations, the method aims to monitor the power path current in a power path, which is connected to the vehicle battery of the vehicle, of a control device and, in the event of a malfunction of the control device, to limit the power path current to a value that has no safety-critical consequences. For this purpose, at least one parallel circuit including a current-limiting unit and an electronic switching unit, is able to be switched on and off by a control unit and is arranged in the power path. On account of the different electrical resistances of the current-limiting unit of such a parallel circuit and the switching unit thereof in its switched-on and switched-off state, in the switched-on state of the switching unit, the current flows through the parallel circuit predominantly in the branch of the parallel circuit that includes the switching unit, but in the switched-off state of the switching unit, predominantly in the branch of the parallel circuit that includes the current-limiting unit. The current is substantially lower in the switched-off state of the switching unit than in the switched-on state of the switching unit. This allows the power path current to be limited in the event of a malfunction of the control device by virtue of the current being predominantly routed via the current-limiting unit of the parallel circuit or, in the case of a plurality of such parallel circuits, via the current-limiting units of the parallel circuits.

In some implementations, a threshold value for the power path current that flows in the power path when each switching unit is switched off is also specified, and the exceedance thereof signals that the integrity of the control device no longer exists. The integrity of the control device is accordingly monitored in the switched-off state of all the switching units by virtue of a present current value of the power path current being ascertained every time that, or regularly while, each switching unit is switched off and being compared with the threshold value. If it is established in the process that the current value reaches or exceeds the threshold value, the power path is not activated in response to an activation signal for the control device, that is to say that all the switching units remain switched off in this case. This ensures that the control device remains in a safe operating state when the integrity thereof no longer exists.

In some examples, each current-limiting unit has an electrical resistance that is at least ten times greater than the electrical resistance of the switching unit, which is connected in parallel with the current-limiting unit, in its switched-on state. Alternatively or additionally, the sum of the electrical resistances of all the current-limiting units has a value that permanently precludes a safety-jeopardizing impairment of the vehicle due to a malfunction of the control device.

The method described above results in a very low power path current flowing in the power path in the switched-off state of all the switching units, and so the control device has a safe operating state in the switched-off state of all the switching units, for example, even if the control device remains permanently in the on-board system of the vehicle despite a malfunction.

In some implementations, a safety criterion for an increase of the determined current values as a function of time is specified. The determined current values are stored and it is ascertained whether the determined current values have an increase as a function of time that infringes the safety criterion. This configuration of the method enables monitoring of the control device over a relatively long period of time. By way of example, the safety criterion stipulates an upper limit for an increase of the determined current values during an activation time of the control device. In this case, the activation time can include successive operating times during which the control device is activated, that is to say during which all the switching units are switched on. If the current values, which are ascertained between these operating times, of the power path current flowing in the power path have an increase that exceeds the stipulated upper limit, this can indicate a deterioration in the functionality of the control device that is, for example, due to aging, and so timely countermeasures can be taken, for example a replacement of the control device.

In some implementations, the switching unit includes a MOSFET (abbreviation for metal-oxide-semiconductor field-effect transistor) or IGBT (abbreviation for insulated-gate bipolar transistor).

In some examples, the activation signal is triggered by the starting of the vehicle. The deactivation signal may be triggered by a driving cycle of the vehicle ending. A driving cycle of a vehicle is understood to mean a period of time from the vehicle starting to the end of a run-on period of the vehicle after it has been turned off.

In some implementations, a plurality of series-connected parallel circuits include a current-limiting unit and an electronic switching unit and are arranged in the power path. This configuration enables a cascaded, and therefore gentle, activation of the control device by virtue of the switching units of the individual parallel circuits being switched on in succession by the control unit.

In some examples, the threshold value is stored in a non-volatile memory of the control device. This advantageously enables a permanent and nevertheless adaptable storage of the threshold value.

In some implementations, a present current value of the power path current flowing in the power path is ascertained every time the control unit is supplied with an activation signal for activating the control device. This advantageously checks the integrity of the control device every time the control unit is supplied with an activation signal for activating the control device.

The method provides steps for monitoring the integrity of a control device, which has at least one intermediate circuit that includes at least one capacitor, such as at least one ceramic capacitor.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
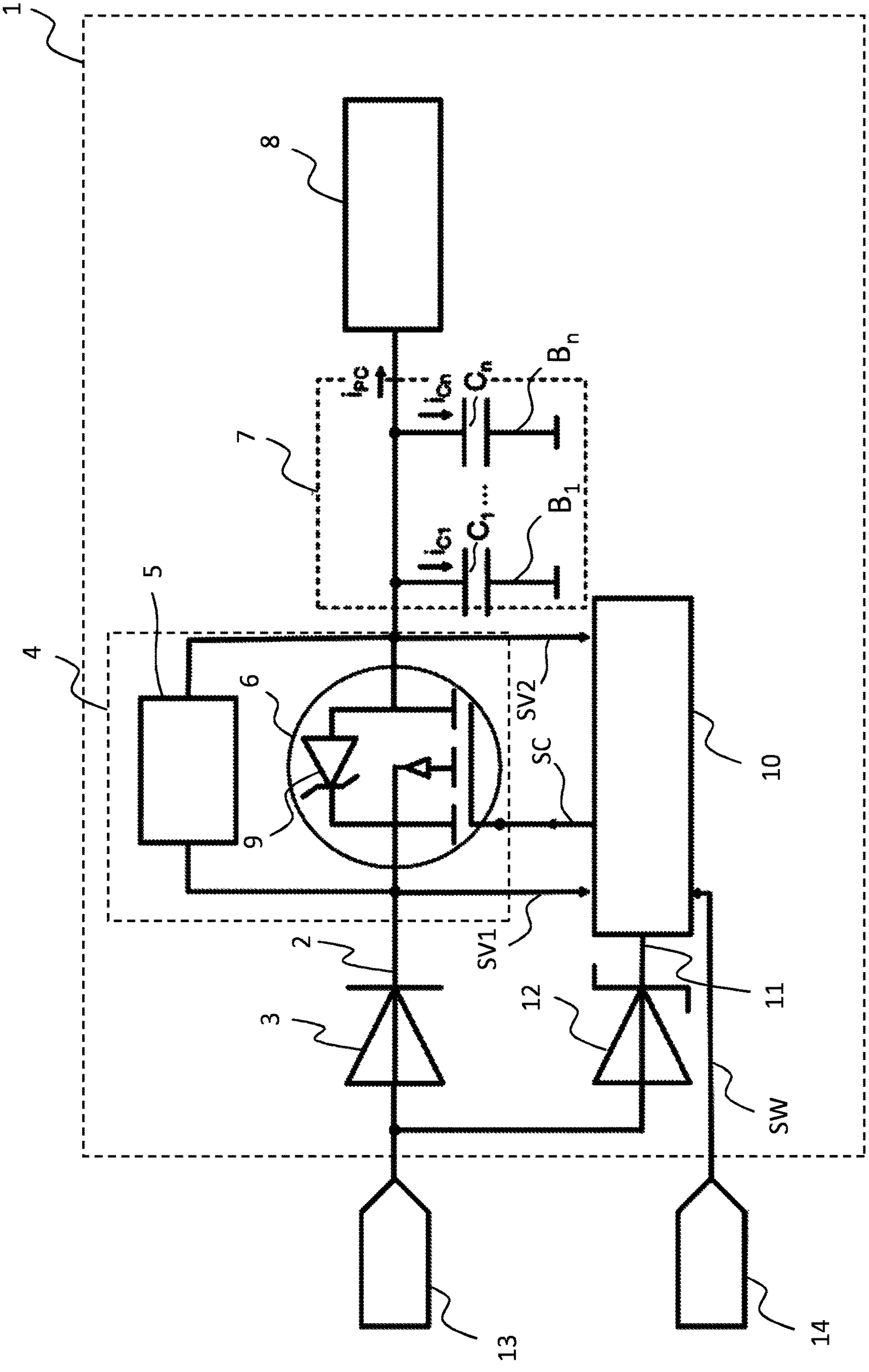
FIG. 1 shows a circuit diagram of a control device that is operated in an on-board electrical system of a vehicle.

FIG. 1 (FIG. 1) shows, by way of example, a circuit diagram of a control device 1 that is operated in an on-board electrical system of a vehicle. The control device 1 has a power path 2, which is connected to a vehicle battery 13. A first polarity reversal protection element 3 is arranged in the power path 2. According to the disclosure, a parallel circuit 4 including a current-limiting unit 5 and an electronic switching unit 6 is also arranged in the power path 2. The control device 1 also includes an intermediate circuit 7 and a power circuit 8, which is able to be supplied with electrical energy through the power path 2. In this example, the intermediate circuit 7 is connected between the parallel circuit 4 and the power circuit 8. Alternatively, the positions of the first polarity reversal protection element 3 and the parallel circuit 4 can also be reversed so that the intermediate circuit 7 is connected between the first polarity reversal protection element 3 and the power circuit 8.

In this example, the first polarity reversal protection element 3 is in the form of a diode. In this example, the current-limiting unit 5 is in the form of an electrical resistor. In this example, the switching unit 6 is in the form of a MOSFET, more precisely of a normally off p-channel MOSFET having an inverse diode 9, which is also referred to as a body diode. The intermediate circuit 7 has a parallel circuit having a plurality of intermediate circuit paths $B_1$ to $B_n$, each including one capacitor $C_1$ to $C_n$. By way of example, the capacitors $C_1$ to $C_n$ are each in the form of a ceramic capacitor.

The control device 1 also includes a control unit 10 that is connected to the vehicle battery 13 via a control path 11 of the control device 1. A second polarity reversal protection element 12, which is likewise in the form of a diode, is arranged in the control path 11. The switching unit 6 is able to be switched to a switched-on state or to a switched-off state by way of the control unit 10. The switching unit 6 is controlled by the control unit 10 by a switching signal SC. The control unit 10 is supplied with a first voltage measurement signal SV1, which represents an electrical potential at the battery-side input of the parallel circuit 4, and a second voltage measurement signal SV2, which represents an electrical potential at the intermediate circuit-side output of the parallel circuit 4. The voltage measurement signals SV1, SV2 are captured by voltage measurement units that are not shown. The control unit 10 is also able to be supplied with a control signal SW, which can assume two values, from a superordinate controller 14. A first value of the control signal SW is an activation signal for activating the control device 1. The second value of the control signal SW is a deactivation signal for deactivating the control device 1. By way of example, the activation signal is triggered by the start of the vehicle, i.e., vehicle starting. By way of example, the deactivation signal is triggered by a driving cycle of the vehicle stopping.

In the switched-on state, the switching unit 6 has a smaller electrical resistance than the current-limiting unit 5. By way of example, the current-limiting unit 5 has an electrical resistance that is at least ten times greater than the electrical resistance of the switching unit 6 in its switched-on state. In the switched-off state, the switching unit 6 has a practically infinitely great electrical resistance, in any case an electrical resistance that is substantially greater than the electrical resistance of the current-limiting unit 5. The current-limiting unit 5 has an electrical resistance that permanently precludes a safety-jeopardizing impairment of the vehicle when the switching unit 6 is switched off due to a malfunction of the control device 1.

Figure 2:
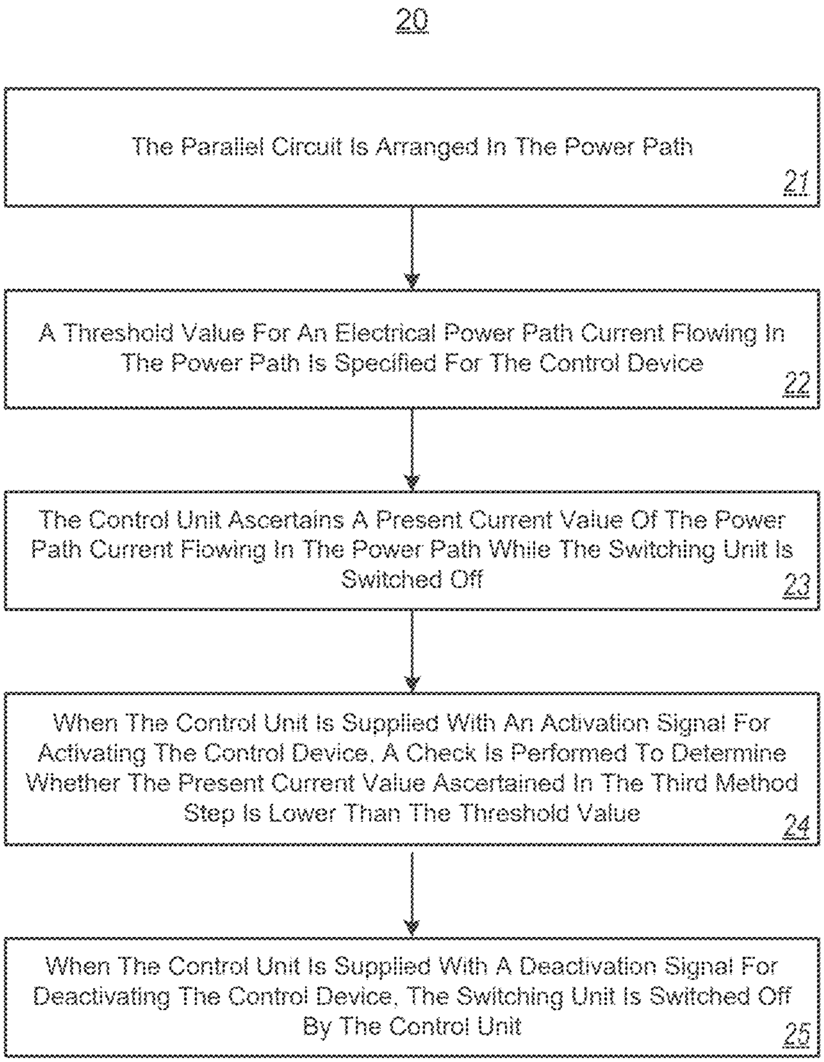
FIG. 2 shows a flowchart of an exemplary method according to the disclosure.

FIG. 2 (FIG. 2) shows a flowchart 20 of an exemplary method. The method includes steps 21 to 25 for monitoring the integrity of the control device 1 shown in FIG. 1. The integrity of the control device 1 is in this case understood to mean the correct functioning of the components of the control device 1, that is to say of the intermediate circuit 7 and of the power circuit 8, that perform the task of the control device 1.

In a first method step 21, the parallel circuit 4 including the current-limiting unit 5 and the switching unit 6 is arranged in the power path 2. The switching unit 6 is kept in the safe switched-off state.

In a second method step 22, a threshold value for an electrical power path current flowing in the power path 2 is specified for the control device 1. By way of example, the threshold value is stored in a non-volatile memory of the control device 1 (not shown in FIG. 1).

In a third method step 23, the control unit 10 ascertains a present current value of the power path current flowing in the power path 2 while the switching unit 6 is switched off. By way of example, the current value is ascertained by the control unit 10 from the voltage measurement signals SV1, SV2 and the electrical resistance of the current-limiting unit 5.

By way of example, the third method step 23 is carried out every time that, or regularly while, the switching unit 6 is switched off. By way of example, the third method step 23 is carried out every time the control unit 10 is supplied with an activation signal for activating the control device 1.

In a fourth method step 24, when the control unit 10 is supplied with an activation signal for activating the control device 1, a check is performed to determine whether the present current value ascertained in the third method step 23 is lower than the threshold value. If the present current value is lower than the threshold value, the switching unit 6 is switched on by the control unit 10. Otherwise, the switching unit 6 remains switched off.

In a fifth method step 25, when the control unit 10 is supplied with a deactivation signal for deactivating the control device 1, the switching unit 6 is switched off by the control unit 10.

Figure 3:
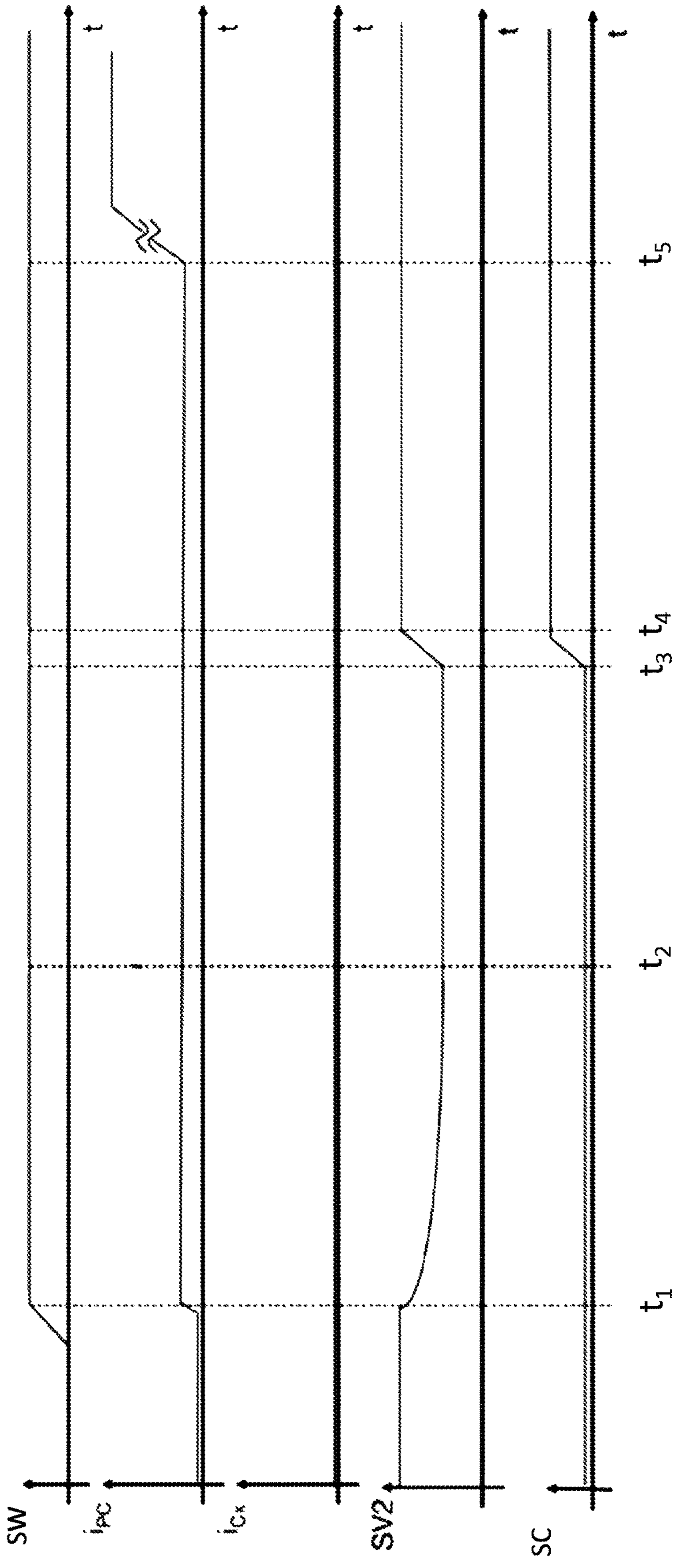
FIG. 3 shows temporal profiles of electric currents in a control device and of signals for monitoring and controlling the control device if the control device does not have a malfunction.

FIG. 3 (FIG. 3) shows profiles of electric currents in the control device 1 and of signals for monitoring and controlling the control device 1 as a function of time t if the control device 1 has no malfunction. The figure shows temporal profiles of the control signal SW, of a supply current $i_{PC}$ of the power circuit 8, of an intermediate circuit path current $i_{Cx}$ flowing in an intermediate circuit path $B_x$, where x is one of the values 1 to n, of the second voltage measurement signal SV2 and of the switching signal SC.

Shortly before an instant $t_1$, the control signal SW and the supply current $i_{PC}$ begin to increase, for example as a result of the vehicle starting. At the instant $t_1$, the control signal SW reaches a value that is the activation signal for activating the control device 1, and the supply current $i_{PC}$ reaches a low initialization value that is, for example, lower than 50 mA. After the instant $t_1$, the second voltage measurement signal SV2 drops slightly to the initialization value on account of the increase of the supply current $i_{PC}$.

The control unit 10 is initialized between the instant $t_1$ and an instant $t_2$.

Between the instant $t_2$ and an instant $t_3$, the present current value of the power path current flowing in the power path 2 is determined and compared with the threshold value specified for the control device 1 by the control unit 10.

In the case shown in FIG. 3, there is no malfunction of the control device 1. For example, all the intermediate circuit path currents $i_{C1}$ to $i_{Cn}$ flowing in the intermediate circuit paths $B_1$ to $B_n$ are low, for example lower than 10 μA in each case. The current value of the power path current flowing in the power path 2 is therefore lower than the threshold value. Therefore, the switching unit 6 is switched on by the control unit 10 after the comparison of the current value of the power path current flowing in the power path 2 with the threshold value, where the switching signal SC rises to a switched-on value and the second voltage measurement signal SV2 increases between the instant $t_3$ and an instant $t_4$.

After the switching unit 6 has been switched on, starting from an instant $t_5$, the supply current $i_{PC}$ begins to increase to an operating value, which, for example, is in a range from 5 A to 120 A.

Figure 4:
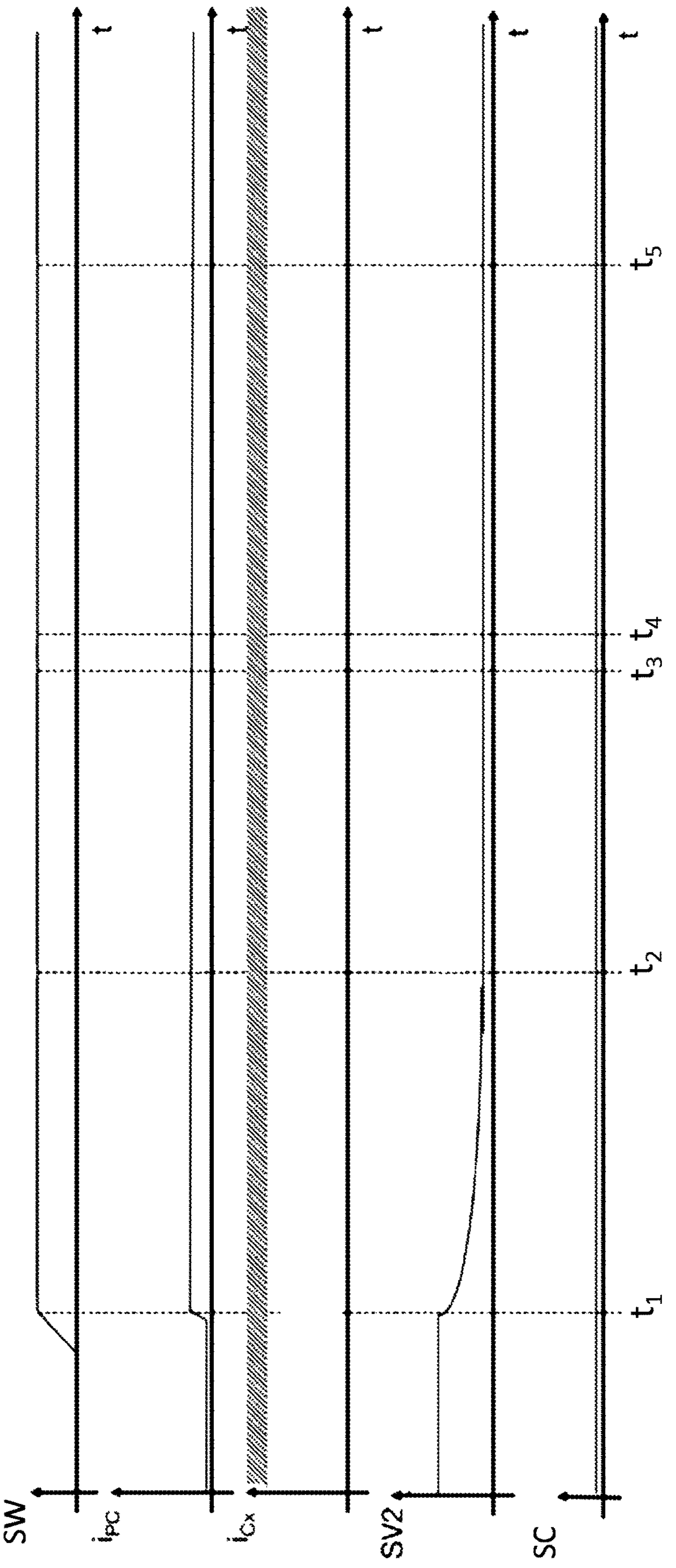
FIG. 4 shows temporal profiles of electric currents in a control device and of signals for monitoring and controlling the control device if the control device has a malfunction.

FIG. 4 (FIG. 4) shows, in a similar manner to FIG. 3, temporal profiles of electric currents in the control device 1 and of signals for monitoring and controlling the control device 1 if the control device 1 has a malfunction. By way of example, in the illustrated case, a capacitor $C_x$ of the intermediate circuit 7 is defective, and so the intermediate circuit path current $i_{Cx}$ flowing in the intermediate circuit path $B_x$ including this capacitor $C_x$ assumes a high value, which, for example, in a region illustrated in a hatched manner in FIG. 4, is approximately 200 mA, for example. On account of this defect of the capacitor $C_x$, a power path current flows in the power path 2, the current value of which exceeds the threshold value specified for the control device 1 after the instant $t_1$. As a result, the switching unit 6 is not switched on by the control unit 10 after the current value of the power path current flowing in the power path 2 has been ascertained, and so the switching signal SC remains at a switched-off value and the supply current $i_{PC}$ remains at the initialization value.

As described in FIGS. 1 to 4, the method can, for example, be modified. Instead of only one parallel circuit 4 having a current-limiting unit 5 and an electronic switching unit 6, a plurality of such parallel circuits 4 are arranged connected in series in the power path 2 of the control device 1. This enables a cascaded, and therefore gentle, start-up of the power circuit 8 by virtue of the switching units 6 of the individual parallel circuits 4 being switched on in succession by the control unit 10. In this case, the sum of the electrical resistances of the current-limiting units 5 is selected such that this sum permanently precludes a safety-jeopardizing impairment of the vehicle due to a malfunction of the control device 1 if all the switching units 6 are switched off. Furthermore, in this case, a present current value of the power path current flowing in the power path 2 is ascertained by the control unit 10 every time that, or regularly while, each switching unit 6 is switched off, and the switching units 6 are switched on, for example in a cascaded manner, by the control unit 10 only after receiving an activation signal if the present current value is lower than the threshold value specified for the control device 1.

A number of implementations have been described. Nevertheless, it will be understood that various modifications may be made without departing from the spirit and scope of the disclosure. Accordingly, other implementations are within the scope of the following claims.

What is claimed is:

1. A method for monitoring the integrity of a control device operated in an on-board electrical system of a vehicle, the control device has a power path connected to a vehicle battery of the vehicle, the method comprising:

arranging a plurality of series-connected parallel circuits in the power path, each one of the plurality of series-connected parallel circuits comprising a current-limiting unit and an electronic switching unit, wherein, by a control unit of the control device, the electronic switching unit is able to be switched to a switched-on state in which it has a lower electrical resistance than the current-limiting unit, or to a switched-off state in which it has a greater electrical resistance than the current-limiting unit;

specifying a threshold value for an electrical power path current that flows in the power path when the electronic switching unit is switched off for the control device;

determining a present current value of the power path current flowing in the power path every time that, or regularly while, the electronic switching unit is switched off;

when the control unit is supplied with an activation signal for activating the control device, switching on the electronic switching unit by the control unit when the respectively present current value is lower than the threshold value; and when the control unit is supplied with a deactivation signal for deactivating the control device, switching off the electronic switching unit by the control unit.

2. The method of claim 1, wherein the current-limiting unit has an electrical resistance that is at least ten times greater than the electrical resistance of the switching unit, which is connected in parallel with the current-limiting unit, in its switched-on state.

3. The method of claim 2, wherein the sum of the electrical resistances of all the current-limiting units has a value that permanently precludes a safety-jeopardizing impairment of the vehicle due to a malfunction of the control device.

4. The method of claim 1, wherein a safety criterion for an increase of the ascertained current values as a function of time is specified, the ascertained current values are stored and it is ascertained whether the ascertained current values have an increase as a function of time that infringes the safety criterion.

5. The method of claim 1, wherein the switching unit comprises a MOSFET or IGBT.

6. The method of claim 1, wherein the activation signal is triggered by the vehicle starting.

7. The method of claim 1, wherein the deactivation signal is triggered by a driving cycle of the vehicle ending.

8. The method of claim 1, wherein the threshold value is stored in a non-volatile memory of the control device.

9. The method of claim 1, wherein a present current value of the power path current flowing in the power path is ascertained every time the control unit is supplied with an activation signal for activating the control device.

10. A use of the method of claim 1 for a control device, which has at least one intermediate circuit comprising at least one capacitor.

11. The use as claimed in claim 10, wherein at least one capacitor of at least one intermediate circuit is a ceramic capacitor.

12. A method for monitoring the integrity of a control device operated in an on-board electrical system of a vehicle, the control device has a power path connected to a vehicle battery of the vehicle, the method comprising:

arranging at least one parallel circuit in the power path, each one of the at least one parallel circuit comprising a current-limiting unit and an electronic switching unit, wherein, by a control unit of the control device, the electronic switching unit is able to be switched to a switched-on state in which it has a lower electrical resistance than the current-limiting unit, or to a switched-off state in which it has a greater electrical resistance than the current-limiting unit;

specifying a threshold value for an electrical power path current that flows in the power path when the electronic switching unit is switched off for the control device;

determining a present current value of the power path current flowing in the power path every time that, or regularly while, the electronic switching unit is switched off;

when the control unit is supplied with an activation signal for activating the control device, switching on the electronic switching unit by the control unit when the respectively present current value is lower than the threshold value; and when the control unit is supplied with a deactivation signal for deactivating the control device, switching off the electronic switching unit by the control unit, wherein the sum of the electrical resistances of all the current-limiting units has a value that permanently precludes a safety-jeopardizing impairment of the vehicle due to a malfunction of the control device.

13. The method of claim 12, wherein the current-limiting unit has an electrical resistance that is at least ten times greater than the electrical resistance of the switching unit, which is connected in parallel with the current-limiting unit, in its switched-on state.

14. The method of claim 12, wherein a safety criterion for an increase of the ascertained current values as a function of time is specified, the ascertained current values are stored and it is ascertained whether the ascertained current values have an increase as a function of time that infringes the safety criterion.

15. The method of claim 12, wherein the switching unit comprises a MOSFET or IGBT.

16. The method of claim 12, wherein the activation signal is triggered by the vehicle starting.

17. The method of claim 12, wherein the deactivation signal is triggered by a driving cycle of the vehicle ending.

18. The method of claim 12, wherein the threshold value is stored in a non-volatile memory of the control device.

19. The method of claim 12, wherein a present current value of the power path current flowing in the power path is ascertained every time the control unit is supplied with an activation signal for activating the control device.

* * * * *